May 4, 1948.	O. N. BRYANT	2,440,844
CONTROL APPARATUS
Filed Sept. 30, 1943
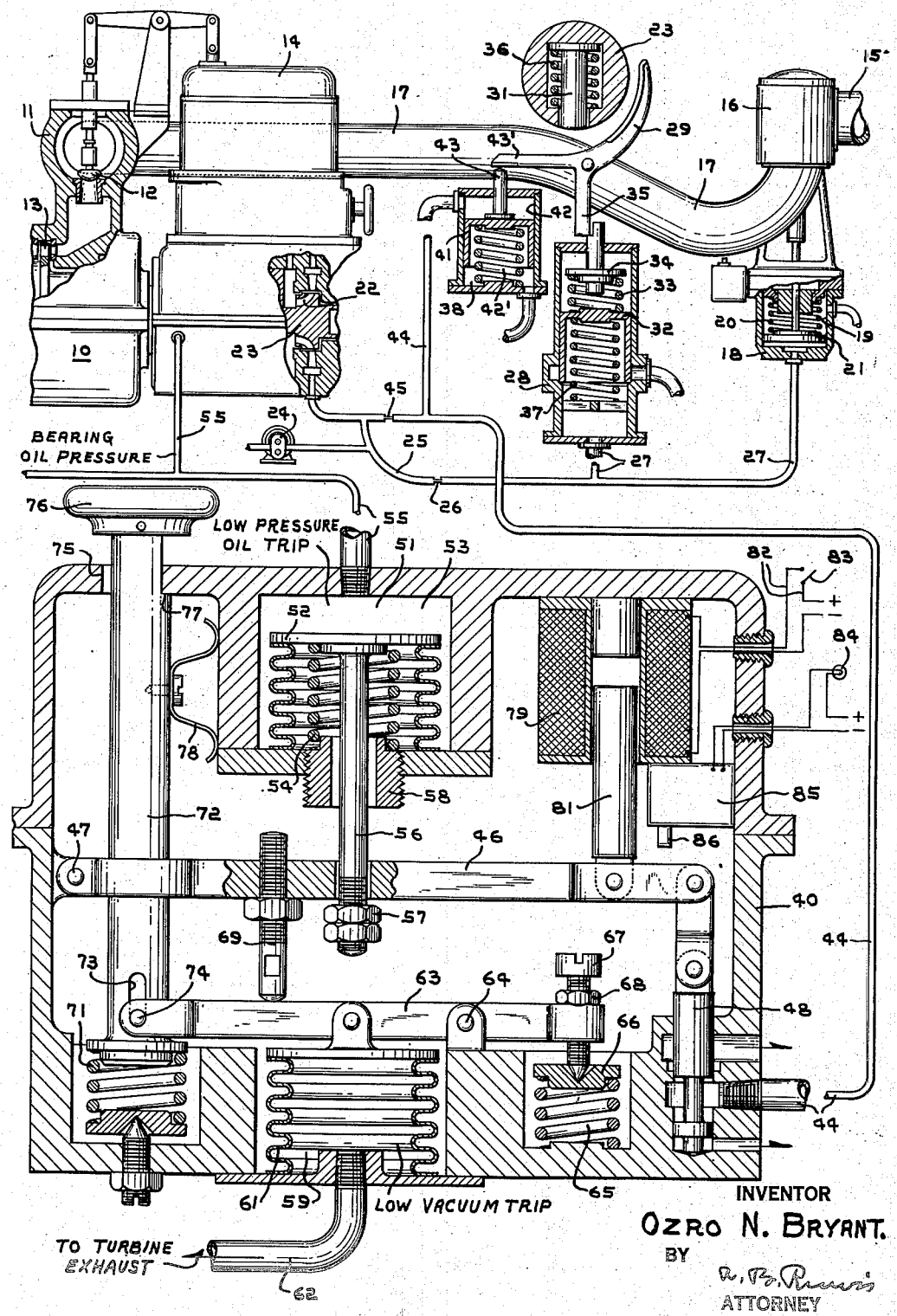
INVENTOR
Ozro N. Bryant.
BY
ATTORNEY Patented May 4, 1948

2,440,844

UNITED STATES PATENT OFFICE 2,440,844

CONTROL APPARATUS

Ozro N. Bryant, Prospect Park, Pa., assignor to Westinghouse Electric Corporation, East Pittsburgh, Pa., a corporation of Pennsylvania Application September 30, 1943, Serial No. 504,374

4 Claims. (Cl. 137—158)

My invention relates to an emergency or auto-stop governing system for a prime mover.

The object of my invention is to provide a simplified emergency governing system.

A further object is to provide an emergency governing system for a condensing turbine or the like, which system shuts off the admission of motive fluid to the turbine upon drop in vacuum to a predetermined low value but only after the predetermined vacuum has once been attained, in order to permit starting of the turbine without necessarily attaining such vacuum.

These and other objects are effected by my invention as will be apparent from the following description and claims taken in connection with the accompanying drawing, forming a part of this application, in which the single figure is a diagrammatic view of an emergency governing system in accordance with my invention.

A condensing steam turbine is shown at 10 and includes a steam chest 11 having governing valves 12 for regulating the flow of steam to the blading 13. The expended motive fluid is exhausted at a vacuum, normally about 29 inches of mercury. A governor 14 actuates the valves 12 in response to the speed of the turbine. So far as the present invention is concerned, the governor 14 may be of any suitable construction. It will be understood that the governor 14 regulates the flow of steam during operation of the turbine, increasing and decreasing the flow in response to decrease and increase, respectively, in turbine speed and thereby maintaining the speed substantially constant or within close limits.

Steam for driving the turbine is supplied through a supply conduit 15. The steam flows from the conduit 15 through a throttle valve 16 and a conduit 17 to the steam chest 11. The throttle valve 16 shuts off the flow of steam for shutting down the turbine, and it is also used for throttling flow of steam to the turbine in starting up. It is fully opened during normal operation, the regulation of the steam being effected by the governor 14 actuating the valves 12.

The throttle valve 16 is provided with a throttle valve operating mechanism 18, which includes a cylinder 19, a piston connected to the throttle valve and movable in the cylinder 19, and a spring 20 biasing the piston 21 downwardly to close the throttle valve.

The throttle valve operating mechanism 18 may be of the construction described and claimed in Patent No. 1,729,458. The parts shown on the drawing, however will suffice for the present invention. Oil pressure for operating the piston 21 is supplied from either an impeller 22 on the turbine shaft 23 or from an auxiliary pump 24, and it is conveyed through conduits 25, an orifice 26 and a conduit 27 to the lower end of the cylinder 19 to move the piston 21 upwardly against the force of the spring 20 to open the throttle valve.

A tripping mechanism for controlling the throttle valve operating mechanism includes a trip valve 28, a trigger 29 and a weight member 31. The trip valve 28 communicates with the conduit 27 and includes a piston valve member 32 which is normally held against its seat by a spring 33 to shut off the escape of oil from the conduit 27. The upper end of the compression spring 33 bears against a spring abutment 34 having a ledge or shoulder adapted to be engaged or latched by an arm 35 of the trigger 29. The weight member 31 is disposed in a radial opening in the turbine shaft 23 and is biased inwardly by a spring 36. The spring is adjusted so that, as the speed of the turbine exceeds a predetermined overspeed, for example, a speed 11% above normal operating speed, the centrifugal force of the weight member 31 overcomes the force of the spring and moves it outwardly from the shaft, so that it strikes the trigger 29 and rotates the same in clockwise direction to disengage the arm 35 from the spring abutment 34. The piston valve member 32 is then moved upwardly under force of the fluid pressure below the valve member and the force of a spring 37. The oil below the piston 21 of the throttle valve operating mechanism 18 now escapes through the trip valve 28 and the spring 20 moves the piston 21 downwardly to close the throttle valve. Oil continues to flow through the orifice 26, but the flow is so restricted by the orifice that no pressure is built up in the conduit 27 as long as the trip valve 28 is open. As the speed of the turbine drops to a lower value, such as 2 percent above normal speed, the spring 36 retracts the weight member 31. It is now possible to reset the tripping mechanism by lowering the spring abutment 34 and re-engaging the arm 35 of the trigger.

The apparatus so far described was known prior to the present invention. To this I have added the following mechanism for also closing the throttle valve upon the occurrence of any one of several abnormal conditions. This additional apparatus includes a pressure-operated device 38 for striking the trigger 29 and a control assembly 40 for controlling the device 38. The latter includes a piston 41 operating in a cylinder 42. A plunger 43 is attached to the piston 41 and is adapted to be moved by the latter under force of a spring 42' to strike an arm 43' of the trigger 29. Oil pressure admitted to the upper end of the cylinder 42 moves the piston 41 downwardly to retract the plunger 43. Oil pressure for operating the piston is supplied from a conduit 44, which is supplied from either the auxiliary pump 24 or the impeller 22 through an orifice 45.

The control assembly 40 includes a lever 46, fulcrumed at 47, and connected to a relay valve 48 which controls the discharge of oil from the conduit 44, the valve being closed when the lever 46 is in the horizontal position shown on the drawing and being opened when the lever is raised to a predetermined higher position. The control assembly 40 further includes several devices for actuating the lever 46. One of these is the low-pressure oil trip 51 which includes a pressure-responsive bellows 52 disposed in a chamber 53 and biased upwardly by a spring 54. A conduit 55, which supplies oil to the bearings of the turbine, is also connected to the chamber 53 so as to subject the bellows 52 to the bearing oil pressure. A stem 56 attached to the pressure-responsive element 52 extends downwardly, and a nut 57 positioned thereon below the lever 46 is adapted to strike the latter and to raise the same upon upward movement of the pressure-responsive element 52. The force of the spring 54 is adjusted by means of a screw-threaded member 58 so that it balances the pressure of the oil on the bellows 52 and raises the lever 46 when such oil pressure is at a minimum desired value, such as 5 lbs. per square inch.

The control assembly 40 further includes a low vacuum trip 59. The latter includes a bellows 61, and a conduit 62 communicates the pressure of the steam exhausted from the turbine to the interior of the bellows 61. The bellows 61 is pivoted to a lever 63, which is fulcrumed at 64. The lever 63 is biased in counterclockwise direction by a spring 65 acting through a spring abutment 66 and a screw 67 held by a lock nut 68. Adjustment of the spring relative to the lever may be provided by turning the screw 67, as will be apparent. The lever 63 is adapted to actuate the lever 46 through a screw 69 carried by the lever 46 and having its lower end adapted to abut the upper side of the lever 63, as shown.

A compression spring 71 is adapted to bias the lever 63 in clockwise direction. The force of the spring 71 is greater than and in opposition to that of the spring 65, so that the resultant spring force biases the lever 63 in clockwise direction. In order to permit the turbine to be started before the predetermined vacuum is obtained, provision is made for controlling the application of the force of the spring 71 to the lever 63. The upper end of the compression spring 71 abuts against the lower end of a stem 72. The stem 72 is formed with a vertically-elongated slot 73, and a pin 74 carried by the lever 63 extends through this slot. The stem 72 extends upwardly through an opening 75 in the casing, and a knob 76 is provided at its upper end for actuating the same. Provision is made for latching the stem 72 in a relatively low position, and in the present embodiment, the stem is formed with a shoulder 77 adapted to abut against the inner surface of the casing adjacent the opening 75, as shown on the drawing, to form a latch. The shoulder 77 is held in such abutting relation by the force of the spring 71. A relatively light spring 78 attached to the stem 72 biases it to the left to disengage the latch.

When the stem 72 is latched, the force of the spring 71 is not imposed on the lever 63. In this case, only the spring 65 acts on the lever 63 in opposition to the pressure within the bellows. The screw 67 is adjusted so that a pressure of two or three pounds per square inch gauge is required within the bellows 61 to overcome the force of this spring 65 and to raise the lever 46.

When the stem 72 is unlatched, as in normal operation, both of the springs act on the lever 63 and produce a resultant spring force tending to rotate it in clockwise direction. Since the bellows 61, in normal operation, is subjected to a sub-atmospheric pressure or vacuum on the inside and to atmospheric pressure on the outside, the pressure differential biases the bellows downwardly to tilt the lever 63 in counterclockwise direction and in opposition to the resultant spring force. The latter is of such value that as the vacuum decreases below a predetermined value, such as 16 inches of mercury, the pressure differential on the bellows is no longer sufficient to overcome the resultant spring force, and the latter moves the lever 63 in clockwise direction. Such movement raises the lever 46 which, in turn, raises the relay valve 48.

The lever 46 may also be raised under manual control at a remote point, such as at the switchboard. The control assembly includes an electromagnet coil 79 and a core 81 connected to the lever 46. The coil 79 is adapted to be energized by a circuit 82 under control of a push button 83, located at any suitable point, such as at the switchboard.

A signal light 84 may also be provided at a remote point, such as at the switchboard, to indicate that the lever 46 is raised. The light 84 is controlled by a switch 85, having a movable element 86 which is engaged by the lever 46 and closes the switch when the lever is in the upper position in which it causes closing of the throttle valve.

It will be apparent that suitable provision for adjusting the parts relative to each other may be provided. Some of these are shown on the drawing. However, since such adjustments may readily be made by one skilled in the art and are thoroughly understood, it is not deemed necessary to describe them.

It will also be apparent that various modifications in the detail construction may be made. For example, instead of the lever 46, which is actuated by any one of the several devices, there may be used some other mechanical element also adapted to be actuated by any one of such devices.

*Operation*

In describing the operation, it will first be assumed that normal operation of the turbine has been established. In the event that the speed of the turbine now exceeds the predetermined overspeed, the centrifugal force of the weight member 31 overcomes the force of the spring 36 and moves it outwardly to strike the trigger 29, tilting the latter in clockwise direction. The arm 35 is thereupon disengaged from the spring holder 34 and the piston valve member 32 is opened under force of the fluid pressure acting thereon and of the spring 37. The oil below the piston 21 of the throttle valve operating mechanism is now released through the trip valve 28 so that the spring 20 moves the piston 21 downwardly to effect complete closing of the throttle valve 16.

To reset the tripping mechanism and to reopen the throttle valve 16, the spring holder 34 is moved downwardly and the trigger arm 35 is re-engaged therewith. Since oil can no longer escape through the trip valve 28, the oil flowing to the pipe through the orifice 26 moves the piston 21 upwardly to reopen the throttle valve.

If the bearing oil pressure fails or falls to a predetermined low value, the spring 54 moves the bellows 52 upwardly against the force of the oil pressure, thereby raising the lever 46. The latter raises the relay valve 48 to permit the escape of oil from the conduit 44 and the upper end of the cylinder 42. Accordingly, the piston 41 is moved upwardly by the spring 42' to strike the plunger 43 against the trigger 29.

The tripping mechanism is thus tripped and the throttle valve is closed in the same manner as described above in connection with overspeed. Upon adequate bearing oil pressure being restored, the lever 46 is automatically restored by the bellows 52. However, the tripping mechanism must be reset as previously described.

Assume again that normal operation of the turbine has been established and that the stem 72 is unlatched. Should the turbine vacuum now decrease below the predetermined value, such as 16 inches of mercury, the pressure differential on the bellows 61 would be decreased, so that the resultant spring force would move the lever 63 in clockwise direction, thereby raising the lever 46. The relay 48 releases oil pressure from the conduit 44 to trip the tripping mechanism and close the throttle valve in the same manner as described above in connection with low bearing oil pressure. If adequate vacuum is restored without shutting down the turbine the control assembly 40 resets itself, but it is necessary to reset the tripping mechanism; that is, to lower the spring abutment 34 and re-engage the trigger arm 35.

Assume now that the turbine is shut down and that it is desired to start the same. Bearing oil pressure is established to lower the bellows 52. The auxiliary pump 24 is also started to provide oil pressure for the device 38 and the throttle valve operating mechanism. The stem 72 is moved downwardly and latched in order to permit starting without the required vacuum. Due to the fact that the stem 72 is latched, absence of the required vacuum in bellows 61 will not permit the spring 71 to raise the lever 46. The force of the spring 65 is preferably such that, at this time, the bellows 61 will not raise the lever 46 unless the pressure therein exceeds two or three pounds per square inch gauge pressure. Accordingly, at this time there is protection against excessive gauge pressure in the exhaust end of the turbine, but the throttle valve is not closed for lack of vacuum.

However, as the vacuum increases, that is, the absolute pressure decreases, the bellows 61 biases the lever 63 in counterclockwise direction and the pin 74 bears against the end of the slot 73 in the stem 72. When the vacuum reaches a value that approximates but is somewhat greater than the predetermined value of 16 inches of mercury; for example, when it reaches a value of 20 inches of mercury, the force on the lever 63 equals that of the spring 71 and begins to move the stem 72 downwardly. As it does so, the shoulder 77 is no longer pressed against the casing, and the spring 78 becomes effective to move the stem 72 to the left to disengage the latch between the shoulder and the wall of the casing. Thereafter, the force of the spring 71 will be effective on the lever 63 and, if the vacuum decreases below the predetermined value, the lever 63 will be tilted to raise the lever 46, as already described.

Should the operator desire to shut down the turbine from the switchboard, he merely closes the switch 83. This energizes the solenoid 79 to raise the lever 46, thereby shutting down the turbine in the same manner as already described.

While the invention has been shown in but one form, it will be obvious to those skilled in the art that it is not so limited, but is susceptible of various changes and modifications without departing from the spirit thereof, and it is desired, therefore, that only such limitations shall be placed thereupon as are specifically set forth in the appended claims.

What is claimed is:

1. The combination with a prime mover exhausting at a pressure below atmospheric and a valve controlling admission of motive fluid thereto, said valve being open in normal operation, of a control mechanism for closing said valve upon said exhaust fluid increasing in absolute pressure to an upper predetermined value after once decreasing to a lower predetermined value comprising a pressure-responsive element subjected to the pressure of said exhaust fluid, a control member actuated by said pressure-responsive element upon a predetermined movement thereof, in the direction of pressure increase, to effect closing of said valve, a spring adapted to exert a force on said control member in the direction to effect valve closing, latching means associated with said pressure-responsive means arranged to be set when the pressure of the exhaust fluid is above said upper predetermined value to remove the force exerted by said spring from said control member and means rendering said latch ineffective in response to said pressure-responsive means being subjected to said once decreased lower predetermined value.

2. A control mechanism comprising a movable control element, means for transmitting a control impulse from said control element upon movement thereof in one direction beyond a predetermined point, means imposing a variable bias on said control element in response to variation in a physical condition, a spring adapted to bias said control element in said one direction, latching means for holding said spring deflected to the extent that it cannot bias said control element at said predetermined point, said latching means being retained in latching position, upon being manually latched, by the force of said spring and being released upon the release of said spring force from the latching means, said control element being adapted, upon sufficient variation in bias imposed thereon by said responsive means to move the same in the direction opposite from said one direction, to deflect said spring sufficiently to release said latching means, whereupon said spring force is imposed on said control element to determine the normal value of the physical condition at which said control element moves to said predetermined point to initiate said control impulse.

3. A control mechanism comprising a movable control element, means for transmitting a control impulse from said control element upon movement thereof in one direction beyond a predetermined point, fluid pressure-responsive means connected to said control element, a spring adapted to bias said control element in said one direction, latching means for holding said spring deflected to the extent that it cannot bias said control element at said predetermined point, said latching means being retained in latching position, upon being manually latched, by the force of said spring and being released upon the release of said spring force from the latching means, said control element being adapted, upon sufficient pressure differential upon said pressure-responsive means moving the same in the direction opposite from said one direction, to deflect said spring sufficiently to release said latching means, whereupon said spring force is imposed on said control element to determine the normal value of the pressure differential acting on said pressure-responsive means at which said control element moves to said predetermined point to initiate said control impulse.

4. The combination with a prime mover having a valve controlling admission of motive fluid thereto, said valve being open in normal operation, of mechanism for closing said valve in response to abnormal exhaust pressure of said prime mover comprising a control element responsive to exhaust fluid pressure, means responsive to movement of said control element in one direction to a predetermined position to effect closing of said valve in response to exhaust fluid pressure above a predetermined value, spring means for biasing said control element in said one direction, said control element being arranged to overcome the force of said spring means at exhaust pressures below a second predetermined pressure, means providing a latch arranged when engaged to render said spring means ineffective, said control element being so associated with the latch to cause said latch to be disengaged when the exhaust fluid pressure is reduced below said second predetermined value when normal operating conditions prevail after starting said prime mover.

OZRO N. BRYANT.

REFERENCES CITED

The following references are of record in the file of this patent:

UNITED STATES PATENTS

| Number | Name | Date |
|---|---|---|
| 1,789,861 | Birmann | Jan. 20, 1931 |
| 1,934,631 | Taylor | Nov. 7, 1933 |
| 2,009,418 | Schwendner | July 30, 1935 |
| 2,146,278 | Woodward | Feb. 7, 1939 |